US008626697B1

(12) United States Patent
Chaine et al.

(10) Patent No.: US 8,626,697 B1
(45) Date of Patent: Jan. 7, 2014

(54) WEBSITE USER PROFILING USING ANONYMOUSLY COLLECTED DATA

(75) Inventors: Olivier Antoine Chaine, Los Angeles, CA (US); Benoit Vatere, Redondo Beach, CA (US); Anand Ramamurthy, Hermosa Beach, CA (US); Scott A. Riley, Bourbonnais, IL (US)

(73) Assignee: magnify360, Inc., Los Angeles, CA (US)

( * ) Notice: Subject to any disclaimer, the term of this patent is extended or adjusted under 35 U.S.C. 154(b) by 467 days.

(21) Appl. No.: 13/037,168

(22) Filed: Feb. 28, 2011

Related U.S. Application Data

(60) Provisional application No. 61/309,367, filed on Mar. 1, 2010.

(51) Int. Cl.
*G06F 17/00* (2006.01)
*G06N 5/02* (2006.01)

(52) U.S. Cl.
USPC ............ 706/50; 709/222; 709/217; 709/224; 709/228; 709/229

(58) Field of Classification Search
None
See application file for complete search history.

(56) References Cited

U.S. PATENT DOCUMENTS

| 7,533,179 B2 * | 5/2009 | Tarquini et al. ............... 709/228 |
| 2007/0282681 A1 * | 12/2007 | Shubert et al. ................. 705/14 |
| 2009/0070443 A1 * | 3/2009 | Vanderhook et al. .......... 709/222 |

* cited by examiner

*Primary Examiner* — Kakali Chaki
*Assistant Examiner* — Luis Sitiriche
(74) *Attorney, Agent, or Firm* — Mintz, Levin, Cohn, Ferris, Glovsky and Popeo, P.C.

(57) ABSTRACT

First contextual data characterizing behavioral attributes of a user visiting at least one web page is received. The first contextual data is collected by anonymously tracking interaction of the user with the at least one web page via a data collector embedded in the at least one web page. Second contextual data characterizing non-behavioral attributes of the user is also received. The second contextual data is based solely on anonymously collected information and it originates from a data source other than the data collector. Thereafter, it is determined which attributes among a plurality of pre-defined attributes are present for the user based on the first contextual data and the second contextual data. The determined plurality of attributes are associated with a best fit amongst a plurality of clusters or associations generated by grouping users with similar attributes that participated in a plurality of historical transactions. Subsequently, using at least one predictive model trained with historical user conversion data, it is determined which of a plurality of available offers for presentation via at least one web page is most likely to result in a conversion of the user based on the pertinent cluster or association so that the presentation of the identified available offer can be initiated. Related apparatus, systems, techniques and articles are also described.

20 Claims, 2 Drawing Sheets

WEBSITE USER PROFILING USING ANONYMOUSLY COLLECTED DATA

RELATED APPLICATION

This application claims priority to U.S. Pat. App. Ser. No. 61/309,367 filed on Mar. 1, 2010, the contents of which are hereby fully incorporated by reference.

TECHNICAL FIELD

The subject matter described herein relates to profiling users of websites using anonymously collected data in order to provide optimized offerings to each user.

BACKGROUND

Website users are increasingly reluctant to provide personal information when casually traversing websites despite such personal information providing enhanced user experiences. Lessened user experiences result in lower conversion rates with regard to presented offerings. Such offerings can include, for example, customized web page configurations, targeted advertisements or microsites, videos, or other media.

SUMMARY

In one aspect, first contextual data characterizing behavioral attributes of a user visiting at least one web page is received. The first contextual data is collected by anonymously tracking interaction of the user with the at least one web page via a data collector embedded in the at least one web page. Second contextual data characterizing non-behavioral attributes of the user is also received. The second contextual data is based solely on anonymously collected information and it originates from a data source other than the data collector. Thereafter, it is determined which attributes among a plurality of pre-defined attributes are present for the user based on the first contextual data and the second contextual data. The determined plurality of attributes are associated with a best fit amongst a plurality of clusters generated by grouping users with common attributes that participated in a plurality of historical transactions. Subsequently, using at least one predictive model trained with historical user conversion data, it is determined which of a plurality of available offers for presentation via at least one web page is most likely to result in a conversion of the user based on the associated cluster so that the presentation of the identified available offer can be initiated.

In another aspect, first contextual data is received that characterizes behavioral attributes of a user visiting at least one web page. The first contextual data is collected by anonymously tracking interaction of the user with the at least one web page via a data collector embedded in the at least one web page. Thereafter, a series of a web services are initiated (in sequence or in parallel) to obtain additional information until a dominant attribute is identified. The additional information pertains to the user based on anonymously collected data other than the first contextual data. The dominant attribute is identified by determining which attributes among a plurality of pre-defined attributes are present for the user based on the first contextual data and the additional information and determining whether any of such attributes is a dominant attribute. The determined plurality of attributes are associated with a best fit amongst a plurality of clusters. The clusters are generated by grouping users with common attributes that participated in a plurality of historical transactions. Subsequently, at least one predictive model trained with historical user conversion data is used to identify which of a plurality of available offers for presentation via at least one web page is most likely to result in a conversion of the user based on the associated cluster. Provision of the identified available offer is then initiated.

In a further aspect, first contextual data characterizing behavioral attributes of a user visiting at least one web page of a website is received. The first contextual data is collected by anonymously tracking interaction of the user with the at least one web page via a data collector embedded in the at least one web page. Second contextual data is also received that characterizes non-behavioral attributes of the user. The second contextual data is based solely on anonymously collected information that originated from a data source other than the data collector. It is then determined which attributes among a plurality of pre-defined attributes are present for the user based on the first contextual data and the second contextual data. This determination is used to associate the determined plurality of attributes with a best fit amongst a plurality of clusters. The clusters are generated by grouping users with common attributes that participated in a plurality of historical transactions. At least one predictive model trained with historical user conversion data is used to determine which of a plurality of available website microsites for presentation via at least one web page is most likely to result in a conversion of the user based on the associated cluster. Presentation of the identified available microsite is later initiated.

Articles are also described that comprise a machine-readable storage medium tangibly (e.g., non-transitorily, etc.) embodying instructions that when performed by one or more machines (e.g., data processors, etc.) result in operations described herein. Similarly, computer systems are also described that may include at least one processor and a memory coupled to the at least one processor. The memory may encode one or more programs that cause the at least one processor to perform one or more of the operations described herein. The methods can be computer-implemented such that each operation is performed by one or more data processors (and such data processors may be part of a single computing system or distributed among many computing systems).

The subject matter described herein provides many advantages. For example, by enabling the profiling of users using anonymously collected data, highly targeted offerings can be provided to such users when they are casually traversing a website. Such an arrangement can greatly increase conversion rates for such users and obviate the need for the user to register or otherwise provide additional contextual information for the website in advance of a particular offering being presented. Aggregated contextual data can be repackaged to provide insight about various trends and such results can form parts of reports, white papers, and the like. In addition, site specific trends can be aggregated and analyzed in order to provide web site operators with greater insight to their users.

The details of one or more variations of the subject matter described herein are set forth in the accompanying drawings and the description below. Other features and advantages of the subject matter described herein will be apparent from the description and drawings, and from the claims.

DETAILED DESCRIPTION

Figure 1:
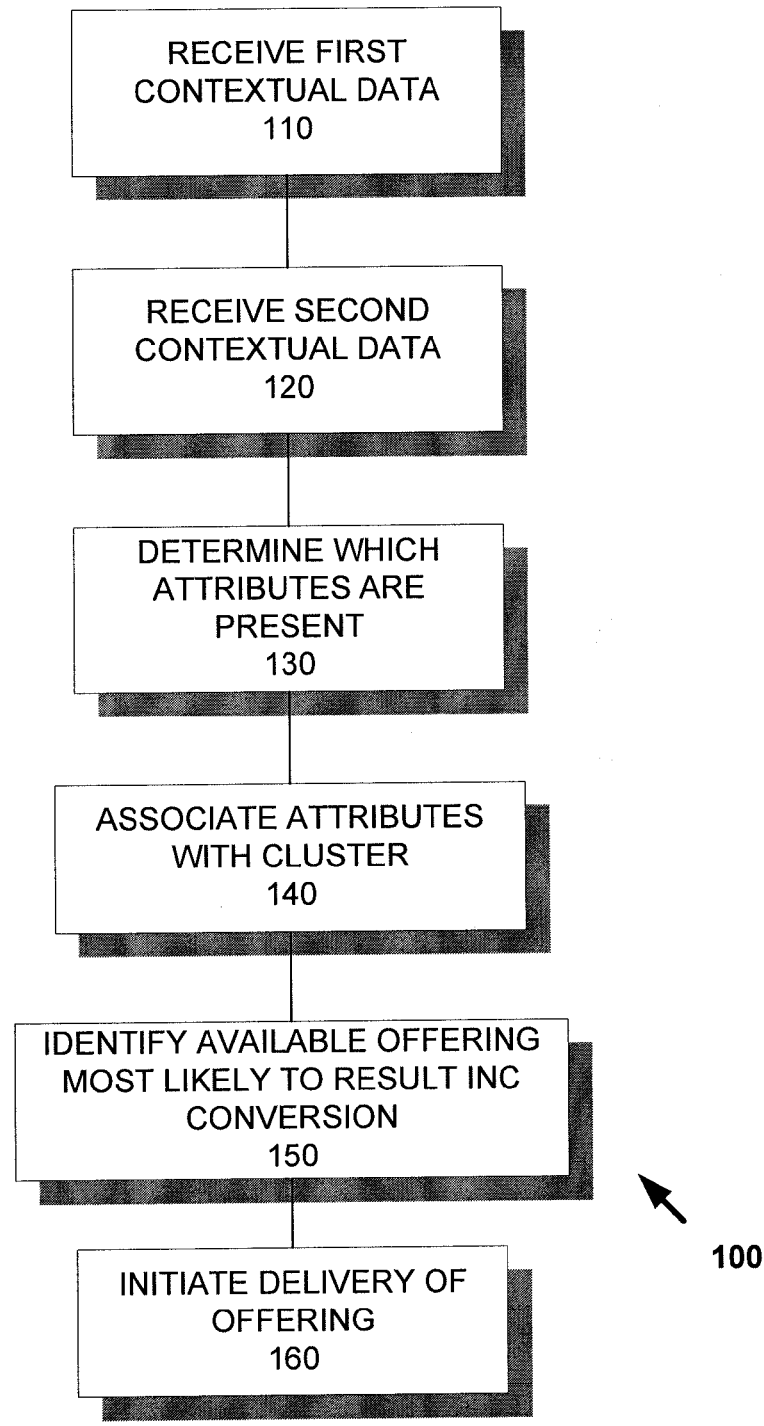
FIG. 1 is a process flow diagram illustrating a technique for profiling a website user using anonymously collected data in order to determine an optimal offer to be presented to the user.

FIG. 1 is a process flow diagram illustrating a method, 100, in which, at 110, first contextual data characterizing behavioral attributes of a user visiting at least one web page is received. The first contextual data is collected by anonymously tracking interaction of the user with the at least one web page via a data collector embedded in the at least one web page. Second contextual data characterizing non-behavioral attributes of the user is, at 120, also received. The second contextual data is based solely on anonymously collected information and it originates from a data source other than the data collector. Thereafter, it is determined, at 130, which attributes among a plurality of pre-defined attributes are present for the user based on the first contextual data and the second contextual data. The determined plurality of attributes are associated, at 140, with a best fit amongst a plurality of clusters generated by grouping users with common attributes that participated in a plurality of historical transactions. Subsequently, using at least one predictive model trained with historical user conversion data, it is determined, at 150, which of a plurality of available offers for presentation via at least one web page is most likely to result in a conversion of the user based on the associated cluster so that the presentation of the identified available offer can, at 160, be initiated.

Figure 2:
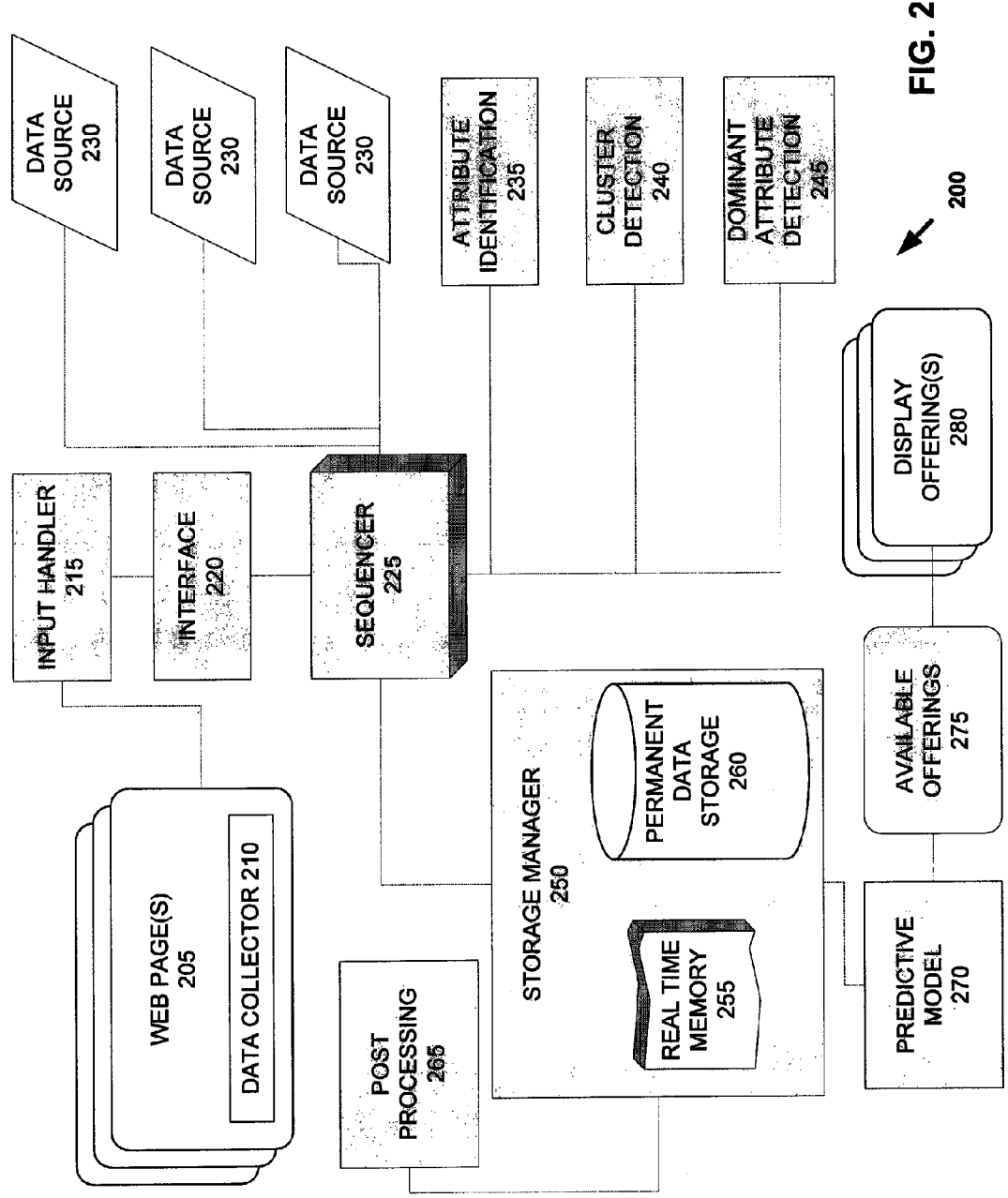
FIG. 2 is a logical work flow diagram of a system for implementing a process as in FIG. 1.

FIG. 2 is a logical work flow diagram 200 that illustrates interaction of a user with a web page 205 of website. For purposes of this discussion, the system will be described in connection with only one web page, however, it will be appreciated that the system can be scaled to include multiple web pages from multiple web sites. The web page 205 includes a data collector component 210 embedded therein. The data collector component 210 characterizes how the user interacts with the web page 205 without obtaining any personalized information from the user (i.e., information that is part of profile previously generated by the user himself/herself, etc.). The data collector component 210 can be a JAVASCRIPT Data Collector that detects and monitors changes in behavior by the user.

The data collector component 210 can be accessed by or otherwise coupled to an input handler 215. The input handler 215 captures data detected and monitored by the data collector component 210. The input handler 215 can comprise a plurality of sub-input handlers that each process a new type of data input as detected by the data collector component 210. Additional sub-input handlers can be defined as needed. Examples of sub-input handlers include pixel handler, scroll handler (which determines how often the user scrolls through web page 205), timer handler (which determines how long the user views the web page 205 or a portion thereof), screen resolution handler (determines screen resolution utilized by user in viewing the web page 205), keyword handler (identifies key words of queries initiated by user on the web page 205), and more. The input handler 215 can also obtain information encapsulated within the initial HTTP request and related messaging that can be used to identify the user. For example, information such as IP address, operating system, browser information and the like can be obtained.

The input handler 215 can be accessed by or otherwise coupled to an interface component 220. The interface component 220 can comprise an interface class to transform data from the input handler from a first format to a second format. The interface component 220 can provide conformity to the way any input is recognized by the system. The interface component 220 can have a 'Visitor' class, which generates a visitorID and also a 'SessionManager' class which associates actions of a visitor and handles the visitor session.

The interface component 220 can be accessed by or otherwise coupled to a sequencer component 225. The sequencer component 225 transforms the raw data obtained from the data collector component 210 to allow for the user to be anonymously profiled. The sequencer component 225 is also coupled to one or more data sources 230. These data sources 230 can be databases or web services that allow for additional information to be obtained about the user as described in further detail below.

The sequencer component 225 can invoke one or more attribute rules forming part of an attribute identification module 235 to determine attributes of a user based on the data obtained by the sequencer component. All rules can be invoked or only a sub-set of the rules can be invoked (i.e., selective invocation). For example, in one implementation, the rules are invoked in a ranked order until a pre-defined number of attributes are identified. In another arrangement, collected data about the user is used to selectively invoke rules based on known information (either from the data collector component 210 or one of the data sources 230).

Each rule can comprise a separate file, which is currently inline into the PDNA. These are supposed to process an input (either using a helper class or by itself depending upon the complexity) into an output, which is stored as an PDNA attribute in the DB. Some rules work off the output of other rules, which is basically 'triggering based on hierarchy'.

Helper Classes (previously called components) are black boxes, which if given an input give a corresponding output. They have no cognizance to where the input is received from or where the output is stored. All they do is dumb processing using either complex math, API or some computation. They are essentially to be invoked by the Rules only not by any other pillar of the system. Some example of helper classes are: UserAgent Helper, Site Helper, IP Helper, Zip Helper, Demographics Helper and so on!

There are three main sources of data that can be used by the rules set 235 in determining attributes for a particular user. First, there is data obtained from the data collector component 210 which, as stated above, characterizes the interaction by the user with a particular web page (or series of web pages). Second, there is data obtained by the input handler 215 that is encapsulated within the HTTP request by the user when initially accessing the web page. Third, there is data from the one or more external data sources 230 (which can comprise, for example, web services, remote databases, local databases, data warehouse queries, etc.). The data from the external data sources 230 can comprise any remaining information that is not available via the input handler 215. For example, while the input handler 215 may be able to identify the IP address of a user, a first web service may need to be initiated to determine a locale for the IP address, and one or more additional web services may be initiated to obtain complementary information such as current weather for such locale, demographics information for such locale, and the like.

The following is an example set of rules that could be used by the attribute identification module 235:

Category: Recency, Frequency, Monetary Value ('RFM')

Absense: Time Since Last Visit a. The Amount of Time Since the visitor's last visit, expressed in days or in "high", "medium", "low"

Customer Lifetime: Time Since First Visit a. The Amount of Time Since the visitor's first visit, relative to the average for a particular site, expressed in days or "long time", "medium", or "recent"

18. Last Page Viewed:
   a. URL of last pageview during this/last session can be used to differentiate between visitors based on the style, content, offers and purpose of the immediately preceeding pages.

Category: Demographics & Age

3. Gender:
   a. gender from user profile web service (i.e., web service which resells user information for a particular IP address or other identifier, etc.)

4. age_band:
   a. age band calculated from user profile web service (e.g., age (0-5, 5-10, etc. ... ))

56. avg_age:
   a. average age of user's zip 57. avg_income:
   a. average income of user's zip 58. avg_house_val:
   a. average house value of user's zip 5. Actual age: age from user profile web service APIs and self-reported information Category: Attitudes & Psychographics 7. Frustrated User:
   a. A person who's behavior indicates current levels of frustration, using the aggressiveness of mouse movements and frequency of using the back button to navigate quickly from one page to another. It may also consist of search terms related to a state of frustration (ie. Sucks, support, broken)

Cool Visitor
   a. Can also include using referral data that would indicate a preference with sites that could be considered trendy or cool, such as popular culture sites, trendy clothing, or popular music sites.

22. Tech Savvy
   a. A visitor who's current browser is not the default browser for the type of computer they are currently on (for example firefox or safari on a Windows PC or Firefox or Chrome on a Apple Computer), or a visitor using an operating system that is not considered commonplace (Linux). This can include inputs for the specific versions (beta releases) of an operating system or browser type.

23. "I'm a Mac"
   a. Similar to a "Cool" user, the "mac guy" attribute uses both the operating system and browser, combined with certain keywords to determine if a users associates themselves with the "mac guy" attributes of counter-culture, young, and hip. Can include users with iphones or other smart phones with similar tactile interfaces (google's android phones) and users with a PC using Safari or other similar products.

24. Tech Phobic/Adverse
   a. A user with very slow mouse movements, typing speeds, or other activity that would indicate a lack of familiarity or comfort with common input devices. Also may include users with older browsers visiting from a residential ip address.

25. Super Geek:
   a. A visitor browsing from a linux or other non-standard computer, using a Linx style text browser, or from certain centers of computing with high densities of technologically savvy populations.

26. PC Guy:
   a. A user of a Microsoft PC, typically using Internet Explorer or similar default settings.

27. Early Adopter:
   a. A visitor using one of the three most recent versions of a web browser, a first generation computer or mobile phone (iphone 2G, for example), or other devices commonly used only by early adopters. May also include search keywords for popular newly released products or upcoming products. May also include having visited certain sites typically frequented by early adopters, such as engadget.com.

8. Composed User:
   a. A person who's behavior indicates current levels of relaxation, using the smoothness of mouse movements and scroll activity to show composure.

Cool Visitor
   a. Can also include using referral data that would indicate a preference with sites that could be considered trendy or cool, such as popular culture sites, trendy clothing, or popular music sites.

Tech Savvy
   a. A visitor who's current browser is not the default browser for the type of computer they are currently on (for example firefox or safari on a Windows PC or Firefox or Chrome on a Apple Computer), or a visitor using an operating system that is not considered commonplace (Linux). This can include inputs for the specific versions (beta releases) of an operating system or browser type.

"I'm a Mac"
   a. Similar to a "Cool" user, the "mac guy" attribute uses both the operating system and browser, combined with certain keywords to determine if a users associates themselves with the "mac guy" attributes of counter-culture, young, and hip. Can include users with iphones or other smart phones with similar tactile interfaces (google's android phones) and users with a PC using Safari or other similar products.

Tech Phobic/Adverse
   a. A user with very slow mouse movements, typing speeds, or other activity that would indicate a lack of familiarity or comfort with common input devices. Also may include users with older browsers visiting from a residential ip address.

Super Geek:
   a. A visitor browsing from a linux or other non-standard computer, using a Linx style text browser, or from certain centers of computing with high densities of technologically savvy populations.

PC Guy:
   a. A user of a Microsoft PC, typically using Internet Explorer or similar default settings.

Early Adopter:
   a. A visitor using one of the three most recent versions of a web browser, a first generation computer or mobile phone (iphone 2G, for example), or other devices commonly used only by early adopters. May also include search keywords for popular newly released products or upcoming products. May also include having visited certain sites typically frequented by early adopters, such as engadget.com.

Happy Visitor:
   a. A visitor is likely to be assigned the attribute for "Happy" based a combination of multiple data inputs, which may include positive search engine keyword choice (eg. Good, Lucky, Fun), the current weather is warmer and less humid relative to the average weather for that city or region during that time of year (temperature, humidity, wind), and the average time spent on a given site being above average with lower than average use of the back button for navigation.

70. Tired User:
   a. Visitors who browse during the late evening or early morning hours are likely to exhibit characteristics of a tired user, which may, in addition to the time of their visit, include browsing activity punctuated by moderate periods of inactivity during one session, or frequent typos and similar behavioral indicators.

72. Passive User:
   a. A visitor who is passive will have one or more of the following behavioral characteristics as inputs: use of primary calls to action and navigation, limited or no use search engines, and limited to no use of shopping carts, forms or pages designed for driving direction or direct customer contact ("contact us" pages).

74. On the Go:
   a. Mobile profile and coming from a travel sight
      i. Examples: travelocity.com, priceline.com, expedia.com, orbitz.com, southwest.com, continental.com, delta.com, aa.com, united.com, amtrak.com, yellowcabco.com, limos.com
   b. person has 3 or more distinct geolocations
   c. browsing from a wireless card (Sprint, AT&T, Verizon, etc)

75. Social Addict:
   a. A visitor who has frequent visits to social media sites, who posts information frequently or searches regularly for social media sites
      i. Examples: facebook.com, myspace.com, reddit.com, twitter.com, linkedin.com, last.fm, livejournal.com, orkut.com, yelp.com, digg.com 76. Politico:
   a. Similar, but for political sites;
      i. Examples: Anything with politic in the name, democrats.org, rnc.org, moveon.org, fivethirtyeight.com, rughlimbaugh.com, hannity.com, tnr.com 77. News Junkie:
   a. Similar, but for news sites
      i. Examples: cnn.com, msnbc.com, foxnews.com, bbc.co.uk, news.google.com, npr.org, cbsnews.com, nytimes.com, latimes.com, washingtonpost.com, usatoday.com, chicagotribune.com, newsweek.com, time.com 78. Sports Junkie:
   a. Similar, but for sports sites
      i. Examples: espn.com, sports.yahoo.com, foxsports.com, sportsillustrated.cnn.com, nba.com, mlb.com, nfl.com, nhl.com, ussoccer.com, cbssports.com, nascar.com 79. Set in Their Way:
   a. A visitor will be assigned this attribute based on the one or more of the following observed behaviors: browsing activity limited to the same times during the day or days during the week over a certain period of time such that relevancy can be confirmed; use of the same primary sites on a regular basis; uses the same search engine or primary home page for navigation to all of their sites.

80. Spontaneous Explorer:
   a. Opposite of the "Set in Their Way" attributes, Spontaneous Explorers may demonstrate inconsistency in the sites that they visit, the times of day and day of week that they browse.

91. One Track Mind
   a. A visitor who's browsing includes primarily sites based on a single theme 92. ADHD Person
   a. A visitor who clicks rapidly from page to page, often skimming content and changing web sites, including changing from topic to topic rapidly Category: Offer Responsiveness 19. Most Recent Offer
   a. The offer that was most recently shown to the visitor, or the offer that was presented in a banner or text advertisement that engaged the user to view the current site.

20. First Offer
   The first offer that was shown to the visitor, or the offer that was presented in a banner or text advertisement that caught the users initial interest and engagement with the current site.

Category: Geolocation & Browsing Modality

28. Mobile User:
   a. a visitor browsing from their mobile phone or on the road, including all smartphones, WAP browsers, and EVDO wireless service providers
   iPhone User:
   a. A subset of mobile users specifically using the Apple IPhone
   US/International Visitor
   a. This is a set of attributes that are grouped together relating to the original location of the visitor (possibly differing from the actual current location of the visitor), which may be set at the continent, country or region level.
   Geolocation
   a. The specific geolocation of the user, commonly found using the ip address of the user or services which provide geolocation using wifi signals or other such location specific data. May also include accurate GPS data, especially for users from gps enabled devices such as mobile phones. Geolocation includes attributes for country, city, state, zip which may be found from existing databases or $3^{rd}$ party service providers.

Cateogry: Shopping Behavior & Preferences

Gadget Freak:
   a. A visitor who visits at least 2 or more technology and gadget oriented sites. Different sites may have different values based on their affinity for gadgets or similar content.
      i. Examples: bestbuy.com, newegg.com, gizmodo.com, coolest-gadgets.com, wired.com, thinkgeek.com
   b. May also include keywords from search engines which are gadget and technology oriented, again with varying values based on the specific nature and frequency of such search terms for a given visitor relative to the general population.
      ii. Examples: gadget, tech*, electronics
   c. May also include visitors using newer products considered gadgets, such as a google android phone, a netbook or other similar products.

Mainstream Consumer:
   a. A visitor who browses at least 2 sites on more than 1 session [source+current] on mainstream consumer websites using a site classification system
      i. Examples: amazon.com, barnesandnoble.com, walmart.com, bestbuy.com, zappos.com usatoday.com, cnn.com, google.com, yahoo.com, msn.com
   b. A visitor who's computer is a mainstream computer such as a dell, HP, or other common brand.

Category: Contextual Preferences (Time, Day, Location)

81. Night Owl:
   a. A visitor who's primary browsing hours are later than typical users, often considered after 10 pm and before 5 am.

82. Early Bird:
   A visitor who's primary browsing hours are early than typical users, often considered after 5 am and before 9 am.

82. Morning Person:
   A visitor who's primary browsing hours are early than typical users, often considered after 9 am and before 12 pm.

82. Afternoon Person:
   A visitor who's primary browsing hours are early than typical users, often considered after 1 pm and before 6 pm.

82. Evening Person:
   A visitor who's primary browsing hours are early than typical users, often considered after 5 pm and before 10 pm.

83. Always at Work
   a. A visitor who browses primarily from a business based ISP or IP address will be considered "Always at Work"

84. Lunchtime Surfer
   a. A visitor who's primary browsing hours are during the typical lunch time for that region's culture, often considered between 11 am and 2 pm.

85. Around the Clock
   a. A visitor who's browses across more than the average number of time segments relative to the general populations browsing habits.
93. Active Online
   a. Visits sites at least twice (2) per day
94. Very Active Online
   a. Visits one or more web sites at least four (4) times per day on average
95. Rarely Online
   a. Visits less than twice per week
96. Regularly Online
   Visits web sites between twice a week and once a day
   Category: Content Consumption Patterns
86. People Person:
   a. A visitor who clicks on banner advertisements featuring "people shots" or "family shots", who clicks on text ads featuring descriptions of people's experiences with a product, service or company, or who spends more time and has higher clickthrough rates on pages featuring such people-oriented text or graphics.
87. Stats Person:
   a. A visitor who spends more time reading pages with product features and statistics and/or clicking through links which claim to lead to such information.
88. Detail Oriented:
   a. A visitor who consumes information on product details, features and other information at a higher rate than the average person for that site. Also a visitor who scrolls through all available content, and will typically click on most or all prominent navigation links and content.
90. Short Form Content:
   a. A visitor who typically does not scroll through content, who's mouse movements are limited to typical high impact areas on the site, and who will abandon websites who's content is too lengthly or dense.
96. Clean Designs
   a. Visitors who primarily browse or visit sites that have minimal page elements and distractions as part of their style sheet or guidelines. Includes sites similar to google.com in design.
97. Busy Designs
   a. Visitors who primarily browse or visit sites that have busy or content heavy page designs and distractions as part of their style sheet or guidelines. Includes sites similar to yahoo.com, amazon.com, etc. . . . in design
98. Pro Design Fans
   a. Visitors who primarily browse or visit sites that have professional looking designs as part of their style sheet or guidelines. Includes sites similar to newyorktimes.com, amazon.com, etc. . . . in design
99. Focus on Value Fans
   a. Visitors who primarily spend time or take action on pages that have price reductions or sales displayed, or comparative prices to other stores. Also may include use of "value", "discount", "price" as keywords or similar messaging in advertisements that these visitors respond to.
100. Visual Learner
   a. A Visual learner may spend more time on pages, or have a higher click-through rate on pages that include graphics, diagrams, and images, or text that has a high percentage of descriptive and visual content. May also include users who use keywords such as "see", "pictures", "on-display", or other visual indicators, or include display advertisements that have heavy visual content.
101. Auditory learner
   a. An Auditory Learner uses keywords like listen, hear, radio, sound, speak and similar auditory indicators
   b. May respond well to voiceover or floating person type advertisements (including clicking on their offers or simply listening to the entire message)
   c. May respond well to, or spend a significant amount of time consuming online video content and news
102. Tactile Learner
   a. A visitor who uses keywords like feel, touch, experience, hands-on, try, build
   b. may also look for opportunities to try a product, either through looking up a store location or a schedule of events where the product will be available for demonstration.
103. Confident
   a. A visitor who's behavior on pages that include strong sales language (eg. "buy today", "no better price", "my best offer", etc. . . . ) indicates a propensity for purchasing or higher engagement, time spent on page or clicks on links with such language. May also include referral pages with similar characteristics, as well as advertisements and keywords.
104. Insecure
   a. A visitor who has a strong preference for pages with testimonials or confidence marks such as trustee or better business bureau. This can include mouse movements over such indicators, or pauses in browsing to read testimonials, etc. . . . This may also take into account content or offers about self-improvement, such as physical enhancement, mental enhancement, or job improvements. May also include referral pages with similar characteristics, as well as advertisements and keywords.
105. Window Shopper
   a. A visitor who frequently browses sites and products, but rarely buys. Often a use who visits primarily the home page or "front window" of a site, without diving deeply into the content or subject matter. Will make heavy use of organic search listings to toggle back and forth between their search engine (eg. Google) and a series of sites.
106. Aisle Browser
   a. A visitor who usually averages several pageviews per site, including looking at multiple products in detail before moving on to other products or to other stores. Will usually consider and consume more information than necessary and have a higher average time on site, which may translate into greater opportunities to upsell products. Generally will exhibit characteristics of greater information gathering needs.
107. Loyal Customer
   a. A visitor who frequents one or more sites on a regular basis, typically over a longer period of time, such as 4 visits over 4 weeks or similar types of measurements. Can include visitors who have more than one purchase from the same online store, and does not browse or comparison shop for better pricing on a given product across multiple stores.
108. Comparison Shopper
   a. A visitor who frequents more than one store, often more than 4 stores, prior to making a purchase decision. Such a visitor may use a comparison shopping site to find products and stores that carry such products. Or they may regularly visit several stores of the same genre before making their purchase. May be loyal to one store, though enjoys the comparison process.
109. Ready to Buy
   a. A visitor who has previously visited the website and focused on purchase information, may have placed items in their cart or wish list, or who has used pricing calculators and similar interactive tools. Such a visitor may search for specific search terms ranging from "Shipping, Buy, Fast Shipping, Free Shipping, In Stock, Purchase, Buy, Checkout, Pricing", etc. . . . Also can include shoppers who type in a specific product name, model number or ID.

110. Post-Purchase Support a. They have visited the support or warranty section of the website, or searched for information using keywords such as "Help, Support, Accessories, Repair, Fix, Patch, Setup".

111. Engaging Influencers a. A visitor who uses features such as "send to a friend" or 'forward page", or who posts links actively in a social media site setting. Can include weightings for different amount of self-promotion and which social media sites are being used, as well as the qualitative aspects of the postings.

112. Information Gathering a. A visitor who visits multiple times, who looks over several pages of product information, including revisiting pages more than once. Can also include visits driven from certain ad units, research and comparison types of sites, or keywords looking at product information, research, comparison, evaluation or reviews.

113. Discount Shopper a. A visitor who regularly uses coupon sites, comparison shopping sites or a visitor who responds well to offers of a certain dollar amount off, or percentage savings in the advertisements as well as on different web sites. Can also use keywords such as "discount, cheap, free, free gift, saving, bargain", etc. . . . For visitors with significant purchase history, having the majority of purchases made during a sale or using coupon codes.

114. Bargain Shopper a. A visitor is considered a bargain shopper if they are searching multiple non-branded or comparison shopping sites to find lower priced versions of similar products, either through off-brand or grey market purchases. Other behaviors that can contribute are use of the search and sorting features of a product site (sorting either high to low or low to high), or using keywords such as "free, cheap, bargain, lowest price, special discount", etc. . . .

115. Quality Shopper a. A visitor who puts quality above all else will have distinct behaviors focused on researching product quality through keywords, reviews and awards sites, expert opinions and consumer-reports type sites. Generally will exhibit behaviors on site such as sorting lists of products by quality (often seen as star ratings), have higher completion rates on pages with trust marks (BBB, Trustee, JD Powers, etc. . . . ) and will use keywords such as "quality, reliable, tested, durable, guarantee, exclusive, best".

116. Brand Shopper a. A visitor is considered a brand shopper if they frequently search for products by brand name, click on ads with branded products above average, or view product information only on branded products. Some visitors may put specific product names as well as brand names, but more frequently will stay at the brand and product type (eg. "Gucci Purse").

117. SubUrban a. A visitor who's home or primary IP address is located in a suburban area based on population density per square mile. Can also be augmented by self-reported zip code data, or other $3^{rd}$ party data sources.

118. Urban High Density a. A visitor who's home or primary IP address is located in a high density urban area. Can also be augmented by self-reported zip code data, or other $3^{rd}$ party data sources.

119. Rural a. A visitor who's home or primary IP address is located in a rural area. Can also be augmented by self-reported zip code data, or other $3^{rd}$ party data sources.

120. Family values a. A visitor with a number of people per household>=2, based on individual level data as well as averages from census and other sources. Can also include the average house size (number of bedrooms) for the visitor's zip code, and may factor in other elements such as regional culture and beliefs.

121. Singles Scene a. A visitor who's number of people per household 21 2, based on individual level data as well as averages from census and other sources. Can also include average house size (condos, etc. . . . ), population density and popularity of the area, and a median age below the average age of marriage in that culture (eg<32.5).

122. College Town a. A visitor from a college town will have area demographics with a low median age (eg <25), and be within 5 miles of a college, university, or military academy. Also can factor in internet access type and ownership, browsing patterns based on times of day, and keywords used (eg. "college, parties, social, etc. . . . ")

123. New Rich a. Visitors in the new rich category will generally have an average household income of over $150,000 based on demographics or individual level data from $3^{rd}$ parties, and maintain a specific median age bracket, from 28 to 45 years old. General browsing patterns consistent with this category include searching for such luxury items as high end cars, audio, televisions, and resorts. May be indicated by a very modern or non-mass-market make and model of computer as well. Heavy use of social media an laptops will be expected.

124. Established Wealth a. Visitors in the established wealth category will generally have an average household income of over $200,000 and an average age of over 45 years old. In addition, they will come from areas with high average home values with larger lots (lower population density) yet still in and near major cities. Browsing habits will generally include more established sites, such as the wall street journal, cnn, etc. and can also be influenced by use of established technology (standard browsers, branded computers, etc. . . . ) and low use of social media.

125. Middle Class a. Visitors are considered middle class profile if their income falls between the ranges for wealthy and poverty for their area, if they live in neighborhoods that are predominantly middle class, or can be correlated with $3^{rd}$ party data sources providing similar characteristics.

126. Fighting Poverty a. Visitors are considered fighting poverty if their income is below the average cost of living for the region they live in, for example with average incomes below $50,000 per household in a metropolitan area. Can include indicators based on the age of the computer, typical bargain sites such as walmart, kmart, or craigslist, and will generally have a lower frequency of computer use, all outside of traditional business working hours.

127. Agreeable, Conscientious, Extroverted, Open to Experience, Neurotic a. Filter by state; data available in STATEDATA under columns with the same first letter as the attribute 128. Weekend Browser a. Visitors who primarily browse the web on the weekend will be considered weekend browsers.

129. Working From Home a. Visitors who access the web from a residential location, using a relatively modern or business class computer, during hours of the day that are typically considered working hours and browsing business or small business related sites. May include heavy use of web-based calendaring, email, etc. . . . and networking sites such as LinkedIn. May also have above average internet access provisions, and will spend substantial amounts of the day online.

130. Stay at Home Parent a. A visitor who browses primarily from a residential location during the middle of the day, may visit family or child oriented sites, or use similarly related keywords for frequent searching, may be classified as a Stay at Home Parent. The visitor may also include frequently interrupted sessions of less than 30 minutes, and have similar usage patterns on a daily weekday basis.

131. Working for the Man a. A visitor who primarily browses business sites from a business location. Generally will be considered if working for larger companies, such as fortune 500 companies or international conglomerates.

132. Government Man a. A Government Man visitor will typically browse at least some national, state or local government sites with greater than average frequency, may have some browsing patterns from government owned IP addresses or use a government issued email address hostname.

133. Browsing for Work a. Browsing the web while coming from a business location will typically indicate a "Browsing At Work" visitor if the sites they visit are related to business products, issues or information. The classification of sites in this manner may be broad to cover a variety of different sites which could be used as business resources, such as business social media and networking sites, etc. . . . May also take into account business hours for that location and or industry in matching visitors to this profile.

134. Stealing My Personal Time a. A visitor who is browsing from a business location sites that are not typically used in business, such as social media sites, online video sites, sports and entertainment sites, etc. . . . May exhibit this behavior at specific times during the day, such as "Coffee 135. Video Lovers a. A Video Lover may have browsing habits that include heavy usage of online video sites such as YouTube, Hulu and others, may video videos on tracked sites, and use visual keywords such as watch, stream, etc. . . .

136. Sell Me Stuff a. Visitors in this category have a high response rate to strong sales language, including words like "buy now, only today, best deal", etc. . . . which may be contained in advertisements, onsite content, headlines and "Buy Now" buttons. These visitors may also favor clicking on display advertisements such as banners and skyscrapers rather than using search, and may have limited browsing of product information or specifications. If such visitors come from search, they will generally use keywords indicating strong direct purchasing interest such as "Buy".

137. Don't Sell Me a. Visitors who are reluctant to respond to strong direct sales language may have heavy reliance on organic search, recommendations of friends, and referral traffic from product reviews and recommendations. Such visitors may also have poor response rates to strong sales language and use keywords such as "learn, investigate", etc. . . .

138. Shop-Aholic a. Shopaholic visitors have heavy usage of ecommerce and auction sites such as Amazon.com, Ebay, and others. Such visitors may exhibit a high propensity to shop on the majority of sessions, or at a high frequency (for example: more than 3 times per week). Keyword usage will typically be heavily focused on products and product names, and such visitors may typically be heavier users of search engines and comparison sites. They may visit many different ecommerce sites during their browsing history.

139. Compulsive Shopper a. Compulsive Shoppers will have conversion rates on shopping sites that are significantly above the average for most visitors to those same sets of shopping sites, especially on non-essential purchases such as fashion, electronics, jewelry and gadgets. Such visitors may also exhibit a higher frequency of searching for specific products and rapidly consummate the transaction, relative to other visitors to those same sites. This can apply broadly to a visitor or may be specific to one or more categories.

140. Unusually Happy a. Current happy status higher than normal

141. Unusually Busy a. Same as above

142. Unusually Active a. Same as above

143. Very Hot a. Temperature>90 F

144. Hot a. Temperature between 70 F and 90 F

145. Cold a. Temperature below 50 F

146. Unusually Hot a. Hot flag is on AND temperature is at least 10 degrees above average 147. Unusually Cold a. Cold flag is on AND temperature is at least 10 degrees below average 148. Unusually Humid Current humidity is at least 15 over average Current humidity can be greater than a certain number that indicates significant noticeable difference in humidity to the average person, as compared to the average humidity that can include location, seasonality, time of day and recent history.

The sequencer component 225 uses the attributes identified by the attribute rules 235 when invoking a cluster detection module 240 which determines an appropriate cluster (amongst a plurality of clusters) that represents a best fit the user (as described in further detail below).

Different clustering or association techniques can be utilized. For example, Lloyd's algorithm (k-means algorithm) can be used. As an example, given an initial set of k means $m_1^{(1)}, \ldots, m_k^{(1)}$, which may be specified randomly or by some heuristic, the algorithm proceeds by alternating between two steps:

Assignment Step:

As but one possibility among many available techniques: Assign each observation to the cluster with the closest mean (i.e. partition the observations according to the Voronoi diagram generated by the means).

$$S_i^{(t)} = \{x_j : \|x_j - m_i^{(t)}\| \leq \|x_j - m_{i^*}^{(t)}\| \text{ for all } i^* = 1, \ldots, k\}$$

Update Step:
Calculate the new means to be the centroid of the observations in the cluster.

$$m_i^{(t+1)} = \frac{1}{|S_i^{(t)}|} \sum_{x_j \in S_i^{(t)}} x_j$$

The algorithm is deemed to have converged when the assignments no longer change.

In some implementations, dominant attributes can be predefined by a dominant attribute module 245 which is accessible by the sequencer component 225. Dominant attributes, which when presented alone, or present in combination with other attributes, can be used to define an appropriate cluster for the user. For example, if it is determined that a user is tech savvy (see above), then other attributes may be disregarded (or weighted less in relation). In addition, when a dominant attribute is identified, the sequencer 225 may cease accessing further data sources 230 in order to minimize processing time and resource consumption. In other words, in some arrangements, the sequencer 225 sequentially or in parallel access multiples data sources 230 to identify attributes, and if a dominant attribute is identified, the remaining accesses of the data sources 230 are terminated.

The sequencer component 225 is coupled to a storage manager 250. The storage manager 250 can store data characterizing the cluster of the user in real time in memory 255 or in permanent storage 260.

The storage manger 250 is in turn coupled to a predictive model engine 270. The predictive model engine 270 is coupled to an available offering queue 275 which identifies available offerings to be presented to the user. The predictive model engine 270 uses one or more predictive models trained on historical transaction data and based, on the cluster, and the available offerings, determines which available offering in the queue 275 is most likely to be successful for the user. Once this determination is made, the offering is presented to the user 280.

The predictive model can use one or more of a variety of underlying technologies. For example, a generalized linear model (e.g. scorecards, etc.) can be used to score the likelihood of the available offerings being successful. A neural network scoring model (e.g., back-propagation neural network model, etc.) can be used in which the cluster data and the offerings are inputted as nodes. Support vector machines (SVMs) can also be used as the predictive model. SVMs are a set of related supervised learning methods used for classification and regression that belong to a family of generalized linear classifiers. SVMs can also be considered a special case of Tikhonov regularization. A special property of SVMs is that they simultaneously minimize the empirical classification error and maximize the geometric margin; hence they are also known as maximum margin classifiers.

The available offerings in the queue 275 can vary depending on the particular web site, product or service offering, or desired user experience. For example, the offerings can include an advertisement encapsulated in one or more of the web pages, a modification of a configuration of one or more of the web pages (e.g., layout, color, image heavy vs. text heavy, etc.), a modification of a sequence of two or more of the web pages, a modification of content encapsulated in one or more web pages, the content including one or more of text, audio, video, and graphics (e.g., high level content vs. granular content, text vs. video etc.), a modification of at least one design element on one or more of the web pages (e.g., logo position, masculine or feminine background, fonts, etc.), redirection of the user to a pre-defined web page (e.g., forwarding user to one of a plurality of pre-selected pages), display of a pre-defined microsite encapsulated in one of more of the web pages (e.g., automotive microsites for each different model offered by manufacturer, etc.). The offerings can be optimized, in some cases, to maximize a number of successful offerings/user conversions. I n other arrangements, the offerings can be optimized to a predetermined level (e.g., optimize to 10% success rate for a first fee level, 20% success rate for a second higher fee level, etc.).

The storage manager 250 can be coupled to a post-processing module 265. The post-processing module 265 can be used to periodically check whether the clusters should be modified to optimize user conversions. Moreover, the post-processing module 265 can monitor whether a particular offering is "successful" (e.g., whether the offering is converted) so that the predictive model(s) used by the predictive model engine 270 can be further trained.

The user profiling described herein can be used in variety of manners. It may be integrated into a solution provided by the website operator or it can be used by a different source accessible via, for example, a web service. In the former scenario, offerings can be targeted on an individual cookie basis based on the cluster of the user and the highest ranking offering (provided by the website operator) as determined by one or more predictive models. As an alternative, the offerings can be outsourced on an individual cookie basis to online ad networks and the like.

Knowledge of where visitors to a particular website came from (and how this is or is not similar to other visitors) can be valuable to making predictions about which content offering may be most effective. Accordingly, the current subject matter can utilize a web graph, which in this context, is a depiction of movement within a set web pages. The graph comprises a set of nodes and edges. The nodes in the graph represent the web pages. The edges between the nodes represent connections from one node to another. The edges may be weighted with a scalar quantity. In the case of a web graph, this weight would represent the number of people who passed from one page to another. Because traffic can go in both directions, the edges would be directed.

Within a web graph, a "transition probability" is the ratio, in a sequence of any two nodes, between the people arriving at a first node and those who then progress to the second node. For example, if 115 people go to node A and 35 people travel from node A to node B, the transition probability from A-B is 35/115. The transition probabilities can be useful in analyzing the quality of both referring page and landing page. Transition probabilities can be analyzed using techniques such as second or nth order Markov chains or linear algebra to reveal paths between nodes that are not directly connected. A time dimension can also be added in order to measure the productivity of a landing page.

The information contained in the web graph can be contextual data that characterizes behavioral attributes of a user visiting at least one web page. The locations of the visited page and the referring page are gathered by the data collector that is embedded in the at least one web page. Thus, the information constituting the web graph (node, edges, weights) can be stored as other behavioral attributes are stored, and they can also be aggregated and analyzed.

Various implementations of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the subject matter described herein may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

References herein to computer-implemented methods include operations, which unless otherwise specified, that can be conducted by one or more data processors contained within one or more computing systems.

Although a few variations have been described in detail above, other modifications are possible. For example, the logic flow depicted in the accompanying figures and described herein do not require the particular order shown, or sequential order, to achieve desirable results. Other embodiments may be within the scope of the following claims.

What is claimed is:

1. A method for implementation by one or more data processors of at least one computing system comprising:

receiving, by at least one data processor, first contextual data characterizing behavioral attributes of a user visiting at least one web page, the first contextual data being collected by anonymously tracking interaction of the user with the at least one web page via a data collector embedded in the at least one web page;

sequentially, or in parallel, initiating, by at least one data processor, a series of a web services to obtain second contextual data characterizing non-behavioral attributes of the user until a dominant attribute is identified, the second contextual data pertaining to the user based on anonymously collected data other than the first contextual data, the dominant attribute being identified by determining which attributes among a plurality of predefined attributes are present for the user based on the first contextual data and the second contextual data and determining whether any of such attributes is a dominant attribute;

associating, by at least one data processor, the determined plurality of attributes with a best fit amongst a plurality of clusters, the clusters being generated by grouping users with common attributes that participated in a plurality of historical transactions;

identifying, by at least one data processor using at least one predictive model trained with historical user conversion data, which of a plurality of available offers for presentation via at least one web page is most likely to result in a conversion of the user based on the associated cluster; and initiating, by at least one data processor, presentation of the identified available offer.

2. A method as in claim 1, wherein receiving second contextual data characterizing non-behavioral attributes of the user comprises:

identifying, by at least one data processor, a location of the user; and polling, by at least one data processor, a remote web server to obtain non-behavioral attributes based on the location of the user.

3. A method as in claim 2, wherein the non-behavioral attributes comprise current weather conditions for the location of the user.

4. A method as in claim 2, wherein the non-behavioral attributes comprise wealth statistics for the location of the user.

5. A method as in claim 2, wherein the non-behavioral attributes comprise an estimated age range for the user.

6. A method as in claim 1, wherein the second contextual data identifies one or more of a browser or a computing system used by the user.

7. A method as in claim 1, wherein initiating presentation of the identified available offer comprises:

displaying, by at least one data processor, a predetermined web page.

8. A method as in claim 1, wherein initiating presentation of the identified available offer comprises:

redirecting, by at least one data processor, the user to a targeted microsite.

9. A method as in claim 1, wherein associating the determined plurality of attributes with a best fit amongst a plurality of user profiles comprises:

determining, by at least one data processor, whether any of the determined plurality of attributes are dominant attributes;

weighting, by at least one data processor, the dominant attributes and the other attributes, the dominant attributes being weighted at a level greater than the other attributes; and associating, by at least one data processor, the weighting attributed with the best fit amongst the plurality of user profiles.

10. A method as in claim 1, wherein the data collector is coupled to a first database, the first database storing collected data for each user.

11. A method as in claim 1, wherein the stored collected data in the first database comprises data collected from two or more traversals of the at least one web page by the user.

12. A method as in claim 1, wherein an identity of the user is characterized using an Internet Protocol (IP) address encapsulated in an HTTP request by the user accessing the at least one web page.

13. A method as in claim 1, wherein the data collector identifies a most recently accessed web page prior to the user accessing the at least one web page, the most recently accessed web page forming part of the attributes.

14. A method as in claim 1 further comprising:
computing, by at least one data processor, transition probabilities from web page to web page as weights, the weights being used by the predictive model to identify the available offer.

15. A method as in claim 1, wherein the identified available offer is selected from a group comprising: an advertisement encapsulated in one or more of the web pages; a modification of a configuration of one or more of the web pages; a modification of a sequence of two or more of the web pages; a modification of content encapsulated in one or more web pages, the content including one or more of text, audio, video, and graphics; a modification of at least one design element on one or more of the web pages; redirection of the user to a pre-defined web page; display of a pre-defined microsite encapsulated in one of more of the web pages.

16. A computer-implemented method for implementation by one or more data processors of at least one computing system comprising:
receiving, by at least one data processor, first contextual data characterizing behavioral attributes of a user visiting at least one web page, the first contextual data being collected by anonymously tracking interaction of the user with the at least one web page via a data collector embedded in the at least one web page;

sequentially, or in parallel, initiating, by at least one data processor, a series of a web services to obtain additional information until a dominant attribute is identified, the additional information pertaining to the user based on anonymously collected data other than the first contextual data, the dominant attribute being identified by determining which attributes among a plurality of pre-defined attributes are present for the user based on the first contextual data and the additional information and determining whether any of such attributes is a dominant attribute;

associating, by at least one data processor, the determined plurality of attributes with a best fit amongst a plurality of clusters, the clusters being generated by grouping users with common attributes that participated in a plurality of historical transactions;

identifying, by at least one data processor using at least one predictive model trained with historical user conversion data, which of a plurality of available offers for presentation via at least one web page is most likely to result in a conversion of the user based on the associated cluster; and initiating, by at least one data processor, provisions of the identified available offer to the user.

17. A method for implementation by one or more data processors of at least one computing system comprising:
receiving, by at least one data processor, first contextual data characterizing behavioral attributes of a user visiting at least one web page of a website, the first contextual data being collected by anonymously tracking interaction of the user with the at least one web page via a data collector embedded in the at least one web page;

sequentially, or in parallel, initiating, by at least one data processor, a series of a web services to obtain second contextual data characterizing non-behavioral attributes of the user until a dominant attribute is identified, the second contextual data pertaining to the user based on anonymously collected data other than the first contextual data, the dominant attribute being identified by determining which attributes among a plurality of pre-defined attributes are present for the user based on the first contextual data and the second contextual data and determining whether any of such attributes is a dominant attribute;

associating, by at least one data processor, the determined plurality of attributes with a best fit amongst a plurality of clusters, the clusters being generated by grouping users with common attributes that participated in a plurality of historical transactions;

identifying, by at least one data processor using at least one predictive model trained with historical user conversion data, which of a plurality of available website microsites for presentation via at least one web page is most likely to result in a conversion of the user based on the associated cluster; and initiating, by at least one data processor, presentation of the identified available microsite.

18. A method as in claim 17, wherein the identified available microsite is displayed as part of the website.

19. A method as in claim 18, wherein the microsite is encapsulated within at least one web page of the website.

20. A method as in claim 17, wherein initiating presentation of the identified available microsite comprises redirected the user to a different website.

* * * * *